United States Patent [19]

Martin

[11] 4,415,773

[45] Nov. 15, 1983

[54] METHODS OF ESTABLISHING A SWITCHING CONNECTION WITHIN A SWITCHING SYSTEM

[75] Inventor: Margaret L. Martin, Boulder, Colo.

[73] Assignee: Western Electric Company, Inc., New York, N.Y.

[21] Appl. No.: 316,374

[22] Filed: Oct. 29, 1981

[51] Int. Cl.³ .......................... H04Q 3/10; H04Q 3/54
[52] U.S. Cl. ............................ 179/18 AD; 179/18 ET
[58] Field of Search ....... 179/18 HA, 18 AD, 18 ET, 179/18 EB, 27 CA, 18 ES

[56] References Cited

U.S. PATENT DOCUMENTS

| | | | |
|---|---|---|---|
| Re. 28,607 | 11/1975 | Richards .......................... | 179/18 ES |
| 2,585,904 | 2/1952 | Busch ............................... | 179/18 R |
| 2,680,781 | 6/1954 | Avery ............................. | 179/18 ET |
| 3,264,415 | 8/1966 | Burns et al. .................... | 179/18 AH |
| 3,394,232 | 7/1968 | Jaeger, Jr. et al. ............. | 179/18 AF |
| 3,529,093 | 9/1970 | Heaton ........................... | 179/18 ET |
| 3,716,675 | 2/1973 | Marek, Jr. et al. ............. | 179/18 ET |
| 4,017,689 | 4/1977 | Richards et al. ............... | 179/18 EB |

OTHER PUBLICATIONS

"Expanded Numbering Plan", M. Boisseau et al., *IBM Technical Disclosure Bulletin*, vol. 17, No. 7, Dec. 1974, pp. 1973–1975.

Primary Examiner—Thomas W. Brown
Attorney, Agent, or Firm—H. St. Julian; J. J. Jordan

[57] ABSTRACT

A PBX system (20) receives a predetermined number of dialing digits from a central office which represents a subscriber station interconnected within the system. The system (20) adds a pseudo digit to the dialing digits to facilitate: (1) the use of a full compliment of dialing digits; and (2) the establishment of a switching connection with the subscriber station. The pseudo digit is then removed and the remaining dialing digits are translated into an equipment location for the subscriber station. Thereafter the switching connection is established with the subscriber station.

3 Claims, 5 Drawing Figures

METHODS OF ESTABLISHING A SWITCHING CONNECTION WITHIN A SWITCHING SYSTEM

TECHNICAL FIELD

This invention relates to methods of establishing a switching connection with a subscriber station interconnected in a switching system which permits the use of a full compliment of dialing digits and more particularly to methods of establishing a switching connection by adding a "pseudo" digit to the dialing digits.

BACKGROUND OF THE INVENTION

Prior private branch exchange (PBX) systems provided consecutive numbering of subscriber stations and, for simplicity, also maintained a correspondence between station numbers and switching equipment locations. This structure was simple but inefficient since gaps in the numbering plan left large blocks of corresponding equipment unused. The use of special dial codes, such as "0" for an attendant or "9" for an outside line, precluded the use of those digits as a first digit in station codes, thus inefficiently using the equipment's capability. For example, a station number such as 9302 could not be used within the PBX system. Upon receiving the station number 9302, the PBX system would generate a dial tone because the first digit "9" is interpreted as a special dial code for an outside line. Consequently, the exclusion of station numbers beginning with digits "0" or "9" eliminates the use of two thousand potential station numbers.

Subsequent telephone switching systems used flexible numbering arrangements which arbitrarily associated a station number with an equipment location. This arrangement efficiently makes use of the equipment since each equipment location is assigned an arbitrary station number and no blocks of equipment need be unused because of gaps in the numbering plan.

One such prior art flexible numbering arrangement is disclosed in U.S. Pat. No. 2,585,904 which issued to A. J. Busch. The Busch patent discloses an apparatus which utilizes the first of four dialed digits to select one of ten available groups of station equipment. Each of the subsequent three dialed digits are translated and used to activate a respective code point within the selected group. The code points are cross-connected to define an equipment location associated with the particular combination of three-dialed digits in each of the ten available groups of station equipment. Thus, the first-dialed digit is used to select the particular group while the last three-dialed digits enable a particular equipment location in each of the ten available groups, yielding a specific equipment location for each dialed four-digit number. However, this efficiency was obtained at the expense of providing an extensive cross-connection arrangement since several cross-connections are needed to define the correspondence between each station number used and the associated equipment location.

Consequently, there is a need for a numbering system which utilizes a full compliment of dialing digits to establish a switching connection without using an extensive cross-connect arrangement.

SUMMARY OF THE INVENTION

The invention contemplates methods of establishing a switching connection to a subscriber station interconnected in a switching system having a plurality of subscriber stations. A predetermined number of dialing digits are stored within the switching system. The stored dialing digits are decoded to determine the type of switching connection which is to be established. A station dial access code is added to the stored dialing digits to form a station intercom number, if a switching connection is to be established with a subscriber station. The station intercom number is then utilized to identify an equipment location of the subscriber station within the switching system. Thereafter, a switching connection is established with the subscriber station having the identified equipment location.

In a preferred embodiment of the invention, the station dial access code is a single, or "pseudo," digit which is used to determine the validity of the station code and is thereafter removed from the station intercom number.

DETAILED DESCRIPTION

Figure 1:
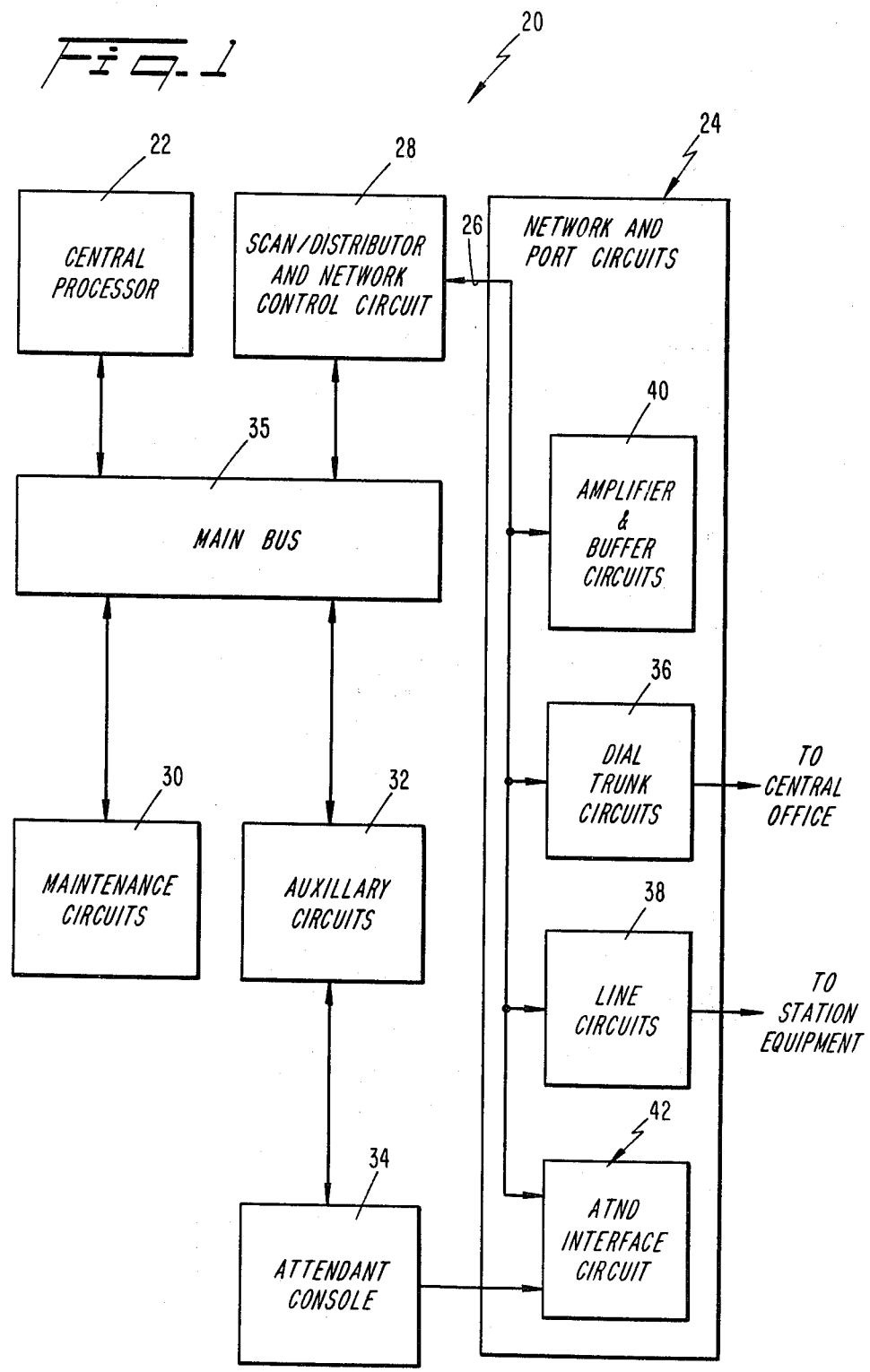
FIG. 1 is a block diagram of a private branch exchange system in accordance with certain principles of the invention.

Referring to FIG. 1, there is illustrated a block diagram of a PBX system, designated generally by the numeral 20. An exemplary system of the type shown as system 20 is disclosed in U.S. Pat. No. 3,978,456 granted Aug. 31, 1976 to J. C. Moran, which system is known as the Dimension ® PBX manufactured by the Western Electric Co., Inc. of New York, N. Y. The system 20 includes a central processor 22 and network and port circuits 24. System 20 further includes a network bus 26, scanner/distributor and network control circuits 28, maintenance circuits 30, auxiliary circuits 32 and an attendant facility, such as an attendant console 34. In addition, the system 20 includes a main bus 35 for interconnecting the central processor 22, scanner/distributor and network circuits 28, maintenance circuits 30 and auxiliary circuits 32.

The central processor 22 facilitates control of the system 20 by executing instructions which are part of an executive control program stored in a random access memory circuit (not shown) interconnected within the central processor 22. The central processor 22 also facilitates control of call processing by (1) periodically interrogating the status of the network and port circuits 24, (2) interpreting a change of status detected within the network and port circuits and (3) issuing commands to the network and port circuits to advance a call to its next logical state. The central processor 22 communicates with the remaining parts of the system 20 through the main bus 35.

The network and port circuits 24 include dial trunk port circuits 36, line port circuits 38, amplifier and buffer circuits 40 and an attendant interface port circuit 42. The network and port circuits 24 facilitate: (1) the connection of the system 20 to a central office (not shown) or a distant PBX (not shown) through dial trunk port circuits 36; (2) the provision of on-hook/off-hook status to the scanner/distributor and network control circuits 28; and (3) reception of commands from the central processor 22 which facilitate a change of state for a particular one of the port circuits 36, 38 and 42.

The scanner/distributor and network control circuit 28: (1) sense the status of the network and port circuits 26 to determine the state of a switchhook (not shown) for line port circuits 38 and any of several states for trunk port circuits 36; (2) contain a system clock (not shown); (3) assign time slots to the port circuits 36, 38 and 42 and (4) synchronize existing system connections.

The maintenance circuits 30 facilitate modification of the configuration of the system 20 and provide alarm and fault indicators for hardware and software faults.

The auxiliary circuits 32 provide a data channel (not shown) for the attendant console 34 and measure the level of traffic which goes into the attendant console.

The executive control program facilitates the monitoring of the behavior of the system 20 and generates a regular and periodic task matrix. A task dispenser program, which receives control from the executive control program, schedules the execution of tasks according to the task matrix generated by the executive control program. Tasks are programs designed to search for a change of state within the system 20. The task dispenser program releases control to a specific-oriented program which thereafter returns control to the task dispenser after the assigned task has been completed.

The system 20 utilizes time division switching to facilitate interconnection between port circuits which include the dial trunk port circuits 36, the line port circuits 38 and the attendant interface port circuit 42. The network bus 26 is time-shared when port circuits 36, 38 and 42 are interconnected during a conversation over the bus for short, periodic intervals called time-slots. All of the port circuits 36, 38 and 42, which are assigned to the same time-slot, are automatically connected to the same conversation.

Each of the port circuits 36, 38 and 42 contain a recirculating shift register (not shown) which serves as a time-slot memory. The shift register, when active in a time slot, is continuously clocked and enables an appropriate time division sampling switch (not shown). The enablement of the appropriate time division sampling switch facilitates the establishment of connection to the system 20.

The system 20 includes a plurality of subscriber stations coupled through line circuits 38. Each of the subscriber stations are identified by an extension number which includes a predetermined number of dialed digits. The system 20 translates the extension number into an internal station equipment location to facilitate the establishment of a switching connection with a particular subscriber station which is identified by the extension number. However, the system 20 utilizes certain dialing digits for call identification purposes such as "0" for an attendant call and "9" for a call which is outside of the PBX system 20. Therefore, these dialing digits would not be available as a first dialing digit of a subscriber station extension number. This creates an inefficient utilization of the station equipment. The preferred embodiment of the present invention enables the system 20 to utilize a full compliment of dialing digits and therefore improve the efficient utilization of station equipment.

Figure 2:
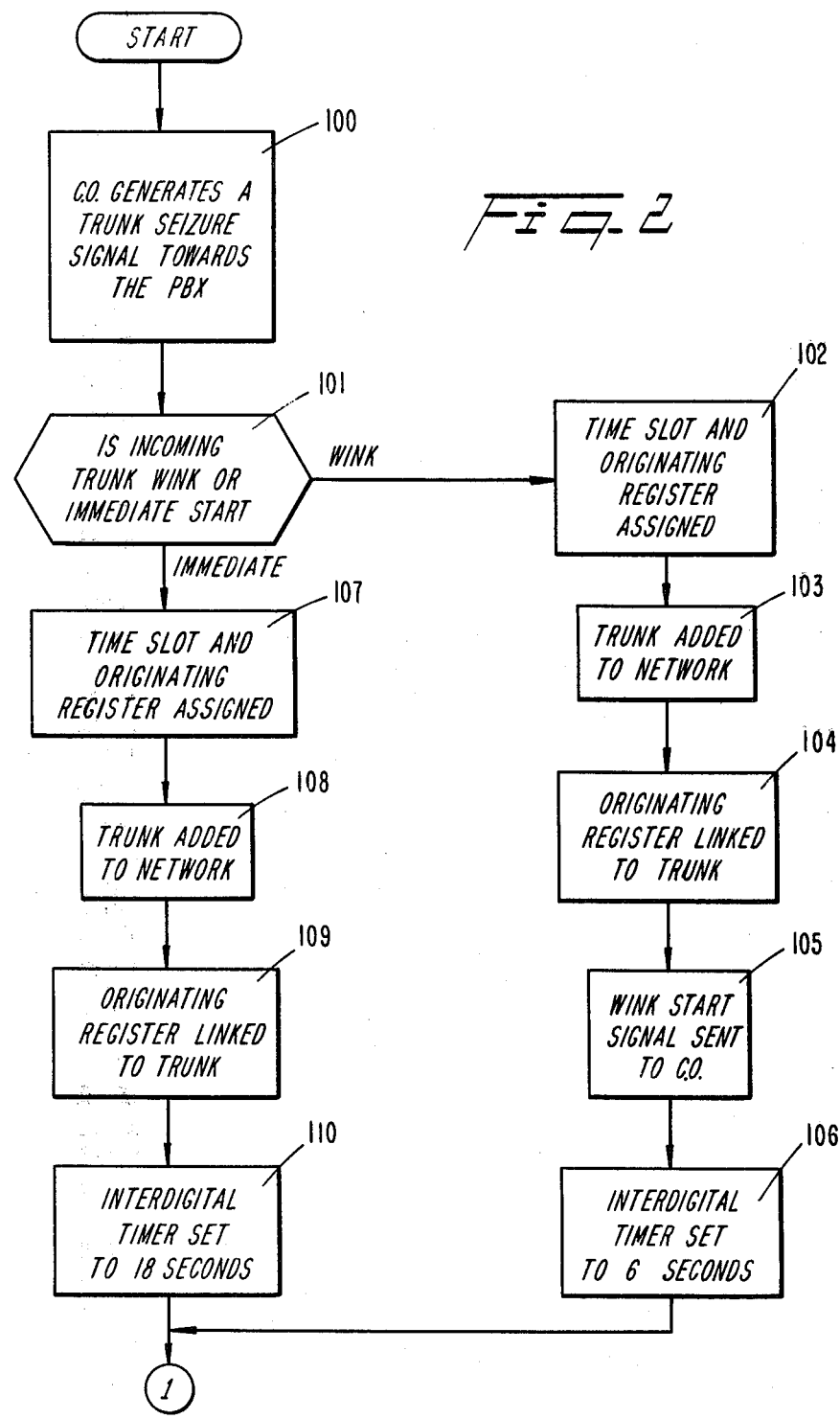
FIGS. 2 through 5 show various flow diagrams which illustrate the programmed procedure of control and operation of the system of FIG. 1 in accordance with certain principles of the invention.
Figure 3:
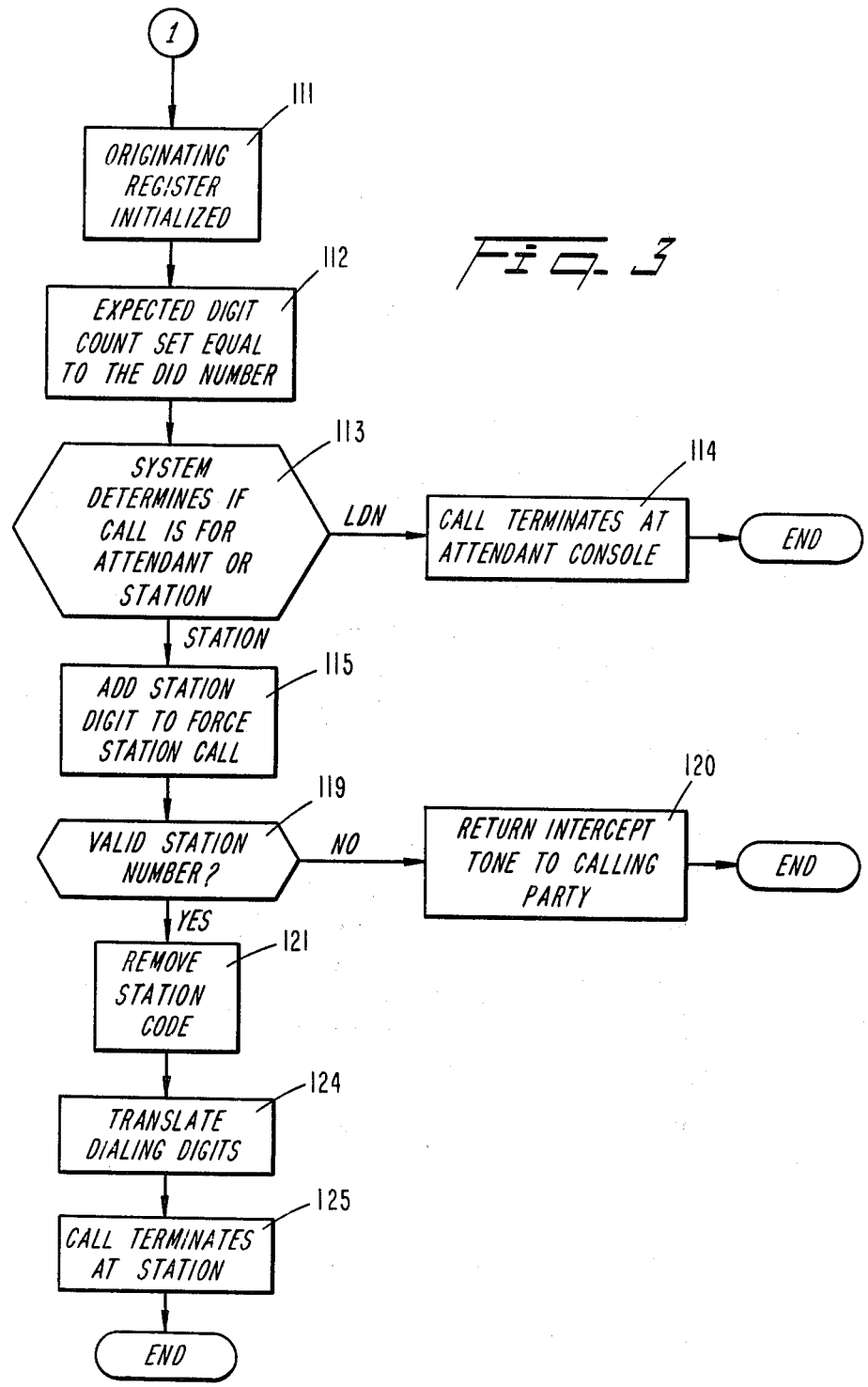

Referring to FIGS. 2 and 3, the flow diagrams illustrated therein reveal the steps of a pseudo five-digit dialing program which enables the system 20 (FIG. 1) to use a full compliment of dialing digits in the establishment of switching connections between a calling party outside of the system and a subscriber station within the system. To enable the system 20 to establish the switching connection, the calling party dials a code which represents the subscriber station desired and normally includes seven dialing digits. A central office or network switch (not shown) interprets the first three of the seven dialing digits to determine the location of the system 20. In step 100, the central office generates and transmits to the system 20 a trunk seizure signal. In step 101, the system 20 determines whether the trunk seizure signal indicates a wink or an immediate start.

If the system 20 determines that a wink start trunk group was used, step 102 enables the central processor 22 (FIG. 1) to select an idle time slot and an originating register. The originating register comprises a set of tables stored in memory which contain status information relative to the state of the switching connection being established. Additionally, the originating register has data storage capability for storing data transmitted from the central office to system 20 over the trunk group. The central processor 22 then sends a command to the scanner/distributor and network control circuits 28 (FIG. 1) to assign the time slot. Thereafter, the scanner/distributor and network control circuit 28 assigns the appropriate trunk port circuit 36 (FIG. 1) to the selected time slot. Step 103 facilitates the closing of a time-division switch (not shown), which is within the trunk port circuit 36, to establish the switching connection with system 20. Step 104 links the originating register to the trunk port circuit 36 to facilitate connection of the dialing digits. In step 105, the system 20 sends a wink start signal to the central office which indicates the central office can transmit the dialing digits to the system. Step 106 initializes an interdigital timer (not shown) to operate for a period of six seconds. The interdigital timer establishes a maximum time limit within which the system 20 must receive a dialing digit from the central office. If the dialing digit is not received from the central office, the trunk group connection with the central office is broken.

If it was determined in step 101 that an immediate start trunk group was used, steps 107 through 109 perform in a manner similar to that described above for steps 102 through 104. However, the central office will transmit the dialed digits immediately without the need of a signal from the system 20. Step 110 initializes the interdigital timer to operate for a maximum period of eighteen seconds as compared with the six second interval described above for a wink-start trunk group. The immediate start requires eighteen seconds since no signaling has been previously exchanged between the central office and system 20 to prepare each system for the transmission and reception of the dialing digits as is accomplished by wink-start trunk. Steps 111 and 112 initialize the originating register to accept an expected number of dialing digits required for a direct inward dialing (DID) call. The dialing digits are stored in the originating register as they are received by the system 20.

When the number of dialing digits received becomes the same as the expected number of dialing digits, step 113 determines whether the dialing digits which are stored in the originating register represent a listed directory number (LDN) or a station number. If the dialing digits represent a LDN, step 114 facilitates the establishment of the switching connection with the attendant console 34 (FIG. 1). However, if the dialing digits represent a station number, step 115 calls a subroutine which adds a station dial access code in order to complete the establishment of a switching connection with the appropriate station.

Figure 4:
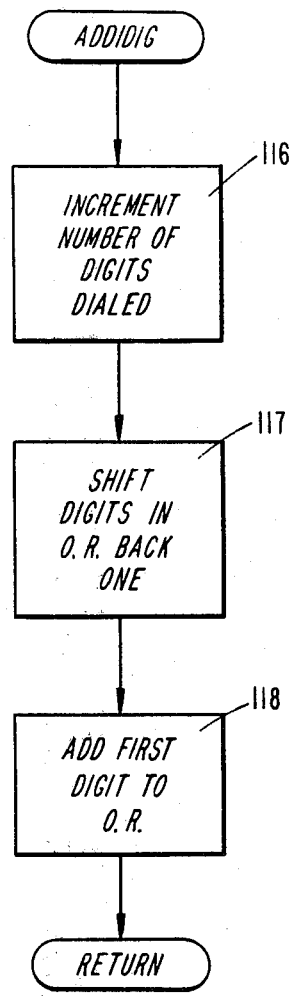

Referring to FIG. 4, the flow chart illustrated therein reveals the steps of an ADD1DIG subroutine which adds the station dial access code to the dialing digits stored in the originating register to form a station intercom number. Step 116 increments the number of dialing digits received. Step 117 shifts the dialing digits which are stored in the originating register one position. Step 118 adds the station access code to the originating register in a first position created by shifting the dialing digits in step 117 and the digits now stored in the originating register are called the station intercom number. Thereafter control of the program is transferred to step 119 (FIG. 3).

Referring again to FIG. 3, step 119 compares a first position digit of the station intercom number, which first digit is the station access code, with dialing digits stored in a first digit table. This comparison determines whether the station access code, which is added to the stored dialing digits, is a valid station code. If the station code is invalid, step 120 facilitates the generation and the routing of an intercept tone to the calling party. However, if the station code is valid, step 121 calls a subroutine which removes the station dial access code from the originating register.

Figure 5:
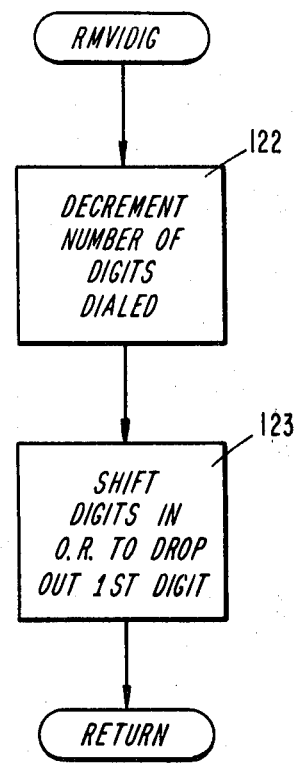

Referring to FIG. 5, the flow chart illustrated therein reveals the steps of a RMV1DIG subroutine which removes the station dial access code, which is the first digit of the station intercom number, from the originating register to facilitate translation of the remaining stored dialing digits into an equipment location of the station dialed. Step 122 decrements the number of dialing digits received by the system 20. Step 123 facilitates the shifting of the dialing digits in the originating register so that the station dial access code is removed. Thereafter, control is returned to step 124 (FIG. 3).

Referring again to FIG. 3, step 124 translates the remaining stored dialing digits into an internal line number. The internal line number indicates the equipment location for the station dialed. Thereafter, step 125 releases the originating register and facilitates the establishment of the switching connection with the station equipment which is identified by the internal line number.

In summary prior PBX systems preclude the use of digits "0" and "9" as the first digit in the station number as described hereinabove. The preferred embodiment of the present invention enables the PBX system 20 to use a full compliment of dialing digits in establishing a switching connection with a subscriber station. When a call is initiated from outside of the system 20, the calling party dials the code which represents the desired subscriber station and which normally includes seven dialing digits, for instance 743-0810. The central office utilizes the first three of the seven dialing digits, in this example 743, to determine the location of the system 20 which includes the desired subscriber station. Thereafter, the central office transmits the remaining four dialing digits, 0810, to the system 20. The system 20 collects the dialing digits 0810 and determines whether the switching connection can be established with the desired station without the intervention of an attendant. If the switching connection can be established directly with the subscriber station, the system 20 adds the station dial access code to the dialing digits as a first digit, for instance adds digit 5 to 0810 to form a station intercom number 50810. The system 20 then interprets the first digit, the 5, which indicates that a switching connection is to be established with a subscriber station. Once it has been determined that the switching connection is to be established with a subscriber station, the system 20 removes the 5 from the station intercom number leaving the four dialing digits, 0810. The system 20 then interprets the remaining four dialing digits 0810 as the station number. In this way, if the first digit of the station number is "0" or "9", the system 20 would not interpret either of these digits as a special dial code. Thereafter the system 20: (1) translates the station number into the internal line number which indicates the equipment location for the desired station; and (2) facilitates the establishment of the switching connection between the appropriate trunk circuit 36 and the desired station.

While one embodiment of the invention has been described in detail above, it will be obvious that various modifications may be made from the specific details described without departing from the spirit and scope of the invention.

What is claimed is:

1. A method of establishing a switching connection to a subscriber station interconnected in a switching system having a plurality of subscriber stations, which comprises the steps of:
    storing a predetermined number of dialing digits;
    decoding the stored dialing digits to determine the type of switching connection which is to be established;
    adding a station dial access code to the stored dialing digits to form a station intercom number if the switching connection is to be established with a subscriber station;
    determining whether the station dial access code portion of the station intercom number is a valid station code;
    removing the station dial access code from the station intercom number;
    translating the remaining stored dialing digits into an internal line number which indicates an equipment location of the subscriber station; and
    establishing a switching connection with the subscriber station having the identified equipment location.

2. The method as recited in claim 1 wherein the predetermined number of dialing digits comprise four digits and wherein the step of adding a station dial access code comprises adding a fifth "pseudo" digit to the four stored dialing digits.

3. A method of establishing a connection to a called subscriber station within a switching system wherein the system uses $n+1$ digits to establish a connection, which comprises the steps of:
    storing n dialed digits representing a called subscriber station number;
    decoding the stored digits to determine if a connection to a subscriber station is to be established;
    adding an additional digit to the stored n digits when it is determined that a connection to the subscriber station is to be established;
    determining whether the additional digit is a valid station code;
    removing the additional digit from the stored $n+1$ digits;
    utilizing the remaining stored n digits to identify the equipment location of the subscriber station; and
    establishing a connection to the called subscriber station identified by the equipment location.

* * * * *